United States Patent [19]

Akao

[11] Patent Number: 4,687,692
[45] Date of Patent: * Aug. 18, 1987

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Kanagawa, Japan

[*] Notice: The portion of the term of this patent subsequent to May 6, 2003 has been disclaimed.

[21] Appl. No.: 850,744

[22] Filed: Apr. 11, 1986

[30] Foreign Application Priority Data

Apr. 15, 1985 [JP] Japan .............................. 60-55961[U]

[51] Int. Cl.$^4$ .............................................. B32B 3/10
[52] U.S. Cl. .................................... 428/137; 428/138; 428/220; 428/224; 428/286; 428/287
[58] Field of Search ............... 428/137, 138, 224, 286, 428/287, 220

[56] References Cited

U.S. PATENT DOCUMENTS

| 2,071,921 | 2/1937 | Dickson | 428/139 |
| 4,258,848 | 3/1981 | Akao et al. | 428/218 |
| 4,331,725 | 5/1982 | Akao | 428/138 |
| 4,452,846 | 6/1984 | Akao | 428/220 |
| 4,587,175 | 5/1986 | Akao | 428/220 |

FOREIGN PATENT DOCUMENTS 2248547 4/1973 Fed. Rep. of Germany ...... 428/286

Primary Examiner—John E. Kittle
Assistant Examiner—Beth A. Bozzelli
Attorney, Agent, or Firm—Burgess, Ryan & Wayne

[57] ABSTRACT

A packaging material for photosensitive materials for photographic purposes which is a laminated film having light-shielding property and comprising,
(a) a perforated film layer of a thermoplastic resin having a thickness of 7 to 150 μm,
(b) a spunbonded nonwoven fabric layer laminated on an adhesive layer which penetrates holes of said perforated film, and
(c) a low-pressure linear low-density polyethylene film layer containing more than 50 weight % of a low-pressure linear low-density polyethylene resin and being located as the inner surface layer.

The packaging material of the invention is superior in the small difference in tear strength between longitudinal direction and lateral direction, in physical strength, in heat sealing properties and in light-shielding property. As a result, its thickness can appreciably be made thinner than the conventional packaging material, and its cost is lowered. This packaging material is usable for a weight photosensitive material and for a roll having a sharp edge.

14 Claims, 14 Drawing Figures

PACKAGING MATERIAL FOR PHOTOSENSITIVE MATERIALS

BACKGROUND OF THE INVENTION

1. Field of the invention

This invention relates to a packaging material for photosensitive materials for photographic purpose.

2. Description of prior arts

Various types of packaging materials for photo sensitive materials for photographic purposes (hereafter simply referred to as "photosensitive materials") have widely been put to practical use, and various properties are required according to their uses.

As the packaging materials for photosensitive materials, it is necessary various properties such as light-shielding, gas barrier, moisture proofing, physical strength such as breaking strength, tear strength, impact puncture strength, Gelbo test strength and wear resistance, heat sealing properties such as heat seal strength, hot tack properties (hot-seal ability), and seal ability of contraries, bag-making aptitude, ply peeling resistance, slipping character and the like. Generally, it is difficult to satisfy these properties by a single material, and a single layer film of a high-pressure low-density polyethylene (LDPE) kneaded with carbon black or a pigment. Therefore, composite laminated film composed of LDPE film containing carbon black or a pigment dispersed therein, and flexible sheet such as paper aluminum foil or cellophane, etc. has been employed. An example of the conventional laminated film is shown in FIG. 11. This film is composed of a light-shielding LDPE film layer 11a, a light-shielding metal foil layer 8a laminated on it through an adhesive layer 2, and a flexible sheet layer 6 laminated thereupon through an adhesive layer 2. Another example of the conventional film is shown in FIG. 12. This film was used for packaging color photographic printing paper, and it is composed of a light-shielding LDPE film layer 11a, a light-shielding metal foil layer 8a, a flexible sheet layer 6, and a light-shielding LDPE film layer 11a. They are laminated in that order, and an adhesive layer 2 is provided between each layers.

On the other hand, the present inventor has already disclosed a laminated film for photosensitive materials of which physical strength was raised by combining two uniaxially stretched films (U.S. Pat. No. 4,331,725). Another laminated film for photosensitive materials shown in FIG. 13 has also been disclosed. This film is composed of a foamed sheet layer 12 and two uniaxially oriented thermoplastic resin film layers 13a, 13a having a light-shielding property and laminated on both faces of the foamed sheet layer 12 directly or through an adhesive layer 2. Thickness of the foamed sheet layer 12 is in the range of 0.3 to 2.0 mm, and expansion ratio is 5 to 50 times. Two uniaxially oriented films 13a, 13a are located so that their molecular orientation axes cross each other at an angle of more than 30 degrees, and the laminated film is compressed up to 40 to 85% of theoretical total thickness. Impact puncture strength and Gelbo test strength of the compressed laminated film is large, and curling hardly occurs. This film is suitable for a heavy material.

Though the above laminated films were made in order to improve the foregoing physical properties, physical properties of these conventional films were still not sufficient and during packaging, the films were sometimes torn or punctured or during heat sealing of the films they sometimes separated, particularly in the cases of heavy products and roll films having a sharp edge. In addition, when a large amount of a light-shielding material such as carbon black was added, physical strength of the film was lowered. Then, the amount of carbon black was set at about 3%, and total thickness of the film was more than 70 $\mu$m. As the result, the film was stiff, and working efficiency of the packaging process was reduced. Cost of the packaging was also expensive. In the case of the laminated film shown in FIG. 12, tear strength, impact puncture strength, Gelbo test strength, etc. were not enough. In the case of the laminated film disclosed in the specification of U.S. Pat. No. 4,331,725, since two layers of uniaxially stretched film were necessary, the laminated film was thick and expensive as a packaging material, though physical properties such as tear strength were improved. In the case of the laminated film shown in FIG. 13, the laminated film was thick and its heat sealing properties were not good in order to secure light-shielding and moisture proofing. Furthermore, since bag-making properties were also not good bags for packaging photosensitive materials was formed by using a heat sealer having a special cooling device, and a hot bar was pressed through a heat-resistant film. As a result of these, the laminated film of FIG. 13 was expensive.

SUMMARY OF THE INVENTION

It is an object of the invention to provide a packaging material for photosensitive materials which is superior in physical properties and heat sealing properties.

It is another object of the invention to provide a packaging material for photosensitive materials which is thin.

It is a further object of the invention to provide a packaging material for photosensitive materials which is inexpensive.

It is a still further object of the invention to provide a packaging material for photosensitive materials which is suitable for a heavy photosensitive material and a roll film having a sharp edge.

The present invention provides a light-shielding packaging material for photosensitive materials for photographic graphic purposes, which is characterized by a perforated film layer, an adhesive layer which penetrates holes of the perforated film layer to adhere a spunbonded nonwoven fabric, and a L-LDPE layer located as the inner surface layer.

Figure 1:
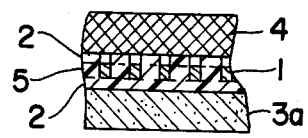
FIGS. 1 to 6 are sectional views of preferred embodiments of the invention.

The packaging material of FIG. 1 is the most fundamental packaging material consisting of a perforated film layer 1, an adhesive layer 2 into which the above perforated film layer 1 is incorporated, a light-shielding L-LDPE film layer 3a located on the inner side of the packaging material, and a spunbonded nonwoven fabric layer 4 located on the outer side. The adhesive 2 is applied to the L-LDPE film layer 3a, and it penetrates holes 5 of the perforated film layer 1 to join the fabric layer 4.

Figure 2:
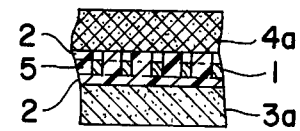

The constitution of the packaging material of FIG. 2 is the same as that of FIG. 1, except that a light-shielding spunbonded nonwoven fabric layer 4a is employed instead of the spunbonded nonwoven fabric layer 4 without a light-shielding material.

Figure 3:
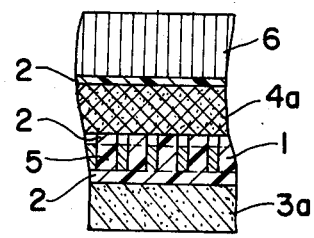

The packaging material of FIG. 3 consists of the laminated film having the constitution of FIG. 2 and a heat-resistant flexible sheet layer 6 laminated thereon on the side of the light-shielding spunbonded nonwoven fabric layer 4a through an adhesive layer 2.

Figure 4:
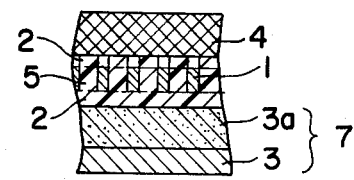

The packaging material of FIG. 4 is the same as that of FIG. 1, except that a coextruded L-LDPE film layer 7 consisting of a light-shielding L-LDPE film layer 3a and a L-LDPE film layer 3 without a light-shielding material is employed instead of the light-shielding L-LDPE film layer 3a.

Figure 5:
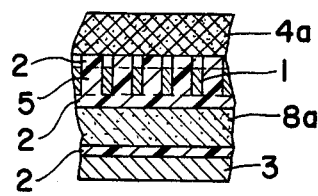

The packaging material of FIG. 5 consists of a perforated film layer 1, an adhesive layer 2 into which this perforated film layer 1 is incorporated, a metal foil layer 8a laminated on the face of the perforated film layer 1 to which the above adhesive is applied, a L-LDPE film layer 3 laminated thereon through an adhesive layer 2 and a light-shielding spunbonded nonwoven fabric layer 4a laminated on the other face of the perforated film layer 1.

Figure 6:
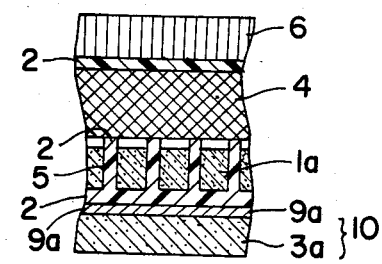

The packaging material of FIG. 6 consists of a perforated film layer containing a light-shielding material 1a, an adhesive layer 2 into which this perforated film layer 1 is incorporated, a metallized light-shielding L-LDPE film layer 10 consisting of a light-shielding L-LDPE film layer 3a and a metal thin film layer 9a joined with the adhesive layer 2, a spunbonded nonwoven fabric layer 4 laminated on the light-shielding perforated film layer 1a and joined with the adhesive 2 penetrated the holes 5, and a flexible sheet layer 6 laminated thereon through an adhesive layer 2.

Figure 11:
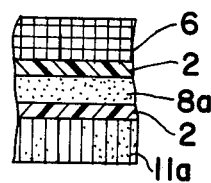
FIGS. 11 to 14 are sectional views of conventional packaging materials.

The conventional packaging material of FIG. 11 consists of a light-shielding LDPE film layer 11a, a metal foil layer 8a laminated thereon through an adhesive layer 2, and a flexible sheet layer 6 further laminated thereon through an adhesive layer 2.

Figure 12:
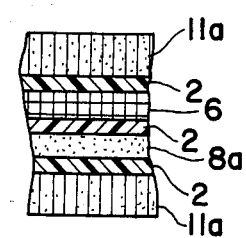

The conventional packaging material of FIG. 12 consists of a light-shielding LDPE film layer 11a, metal foil layer 8a laminated thereon through an adhesive layer 2, a flexible sheet layer 6 laminated thereon through an adhesive layer 2, and a light-shielding LDPE film layer 11a laminated thereon through an adhesive layer 2. This laminated film was used as the packaging material for a roll of photographic color printing paper.

Figure 13:
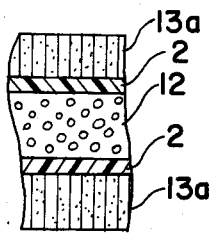

The conventional packaging material of FIG. 13 consists of a foamed sheet layer 12, and two light-shielding uniaxially oriented films 13a, 13a laminated on both faces of the foamed sheet layer 12 so that their molecular orientation axes cross each other. This fortified laminated film was used as the packaging material for a roll film for movie of longer than 1000 feet length for which a metal can was not used.

Figure 14:
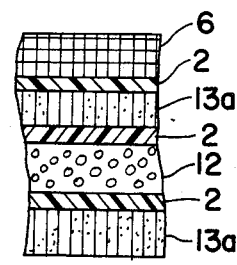

The conventional packaging material of FIG. 14 consists of a laminated film having the same constitution as that of FIG. 13 and a heat-resistant flexible sheet layer 6 laminated thereon through an adhesive layer 2. The flexible sheet layer 6 was added in order to improve bag-making aptitude and printability, this laminated film was the strongest conventional packaging material suitable for a heavy product.

DETAILED DESCRIPTION OF THE INVENTION

The laminated film of the invention at least contains a perforated film layer, a spunbonded nonwoven fabric layer, an adhesive layer penetrating holes of the perforated film, and a L-LDPE film layer located as the inner surface layer.

The perforated film layer is made of a thermoplastic resin. Examples of the thermoplastic resin include polystyrene, polyamides (various nylons), ethylene-vinyl acetate copolymer (EVA), ethylene-ethylacrylate copolymer (EEA), polyethylene terephthalate (PET), polyvinyl chloride (PVC), polyvinylidene chloride (PVDC), a low-pressure high-density polyethylene (HDPE), a low-pressure medium-density polyethylene (MDPE), LDPE, L-LDPE and polypropylenes. The perforated film layer contains such a thermoplastic resin as a main constituent.

Suitable thickness of the perforated film layer is 7 to 150 $\mu$m. When the thickness is thicker than 150 $\mu$m, manufacture of the perforated film suitable for the invention becomes difficult, and the cost of the packaging material is raised by the increase of the amount of resin. It is also necessary to increase the amount of the adhesive applied to the perforated film, and it brings to lower its application rate, to raise the materials cost, uneven adhesive strength, to lower flatness, and to increase stiffness of the laminated film. On the other hand, when the thickness is thinner than 7 $\mu$m, the effect of the perforated film becomes insufficient. Stiffness, Gelbo test strength, tear strength and perforation strength are small, and curling happens. Furthermore, the perforated film sometimes breaks during its production.

As the manufacturing process of the perforated film, a thermoplastic resin film is first formed by a known method to manufacture a perforated film. Such a method includes single extrusion and coextrusion by T die extrusion, inflation process, submerged rotating method, etc. The film is perforated by using a punching die or a rotating body on which many needles are provided. The needles may by heated. The perforation may be carried out at the extrusion of the film, immediately after thereof or after cooling of the film. The film may perforated by adding a foaming agent. The above methods may be combined. For example, the method disclosed in Japanese Patent KOKOKU No. 52-4675 is suitable in terms of saving the raw material, removing the occurrences of burr and fissure at perforation, and a fine and tough perforated film can be obtained inexpensively. In this method, various polyethylenes, various polypropylenes, various nylons, polystyrene, EVA, EEA, PVC, or etc. was employed as the thermoplastic resin, and perforation is carried out at the time of extrusion.

The perforated film may be uniaxially or biaxially stretched after cooling. Thereby, a perforated film is strengthened, and holes are made large.

Figure 7:
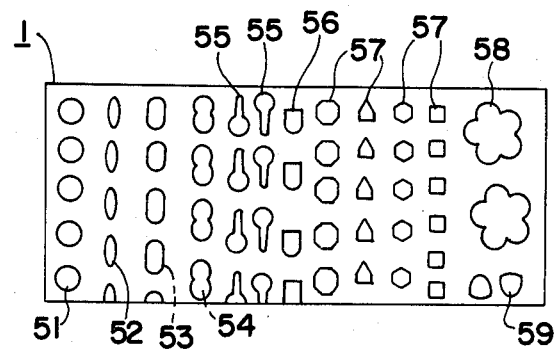
FIG. 7 is a plan view indicating examples of holes of a perforated film.
Figures 8, 9:
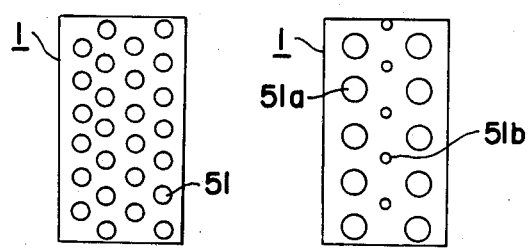
FIGS. 8 to 10 are plan views of perforated films.
Figure 10:
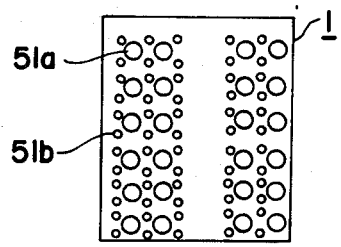

Shape of the hole may be, as shown in FIG. 7, a circle 51, an oval 52, a pillow 53, a cocoon 54, a gourd 55, an arch window 56, a polygon 57 like a square, a pentagon, a hexagon and an octagon, a petal 58, a round triangle 59, and any other figure not having an acute angle less than 90 degrees. On the other hand, figures having an acute angle such as a star, a triangle and a slender rhomb are not desirable. Two or more shapes and sizes may be combined. Some combinations of large circles 51a and small circles 51b are shown in FIGS. 8 to 10. The hole area ratio represented by the following formula is 10 to 90%, preferably 20 to 80%, more preferably 30 to 70%.

$$\text{The hole area ratio} = \frac{\text{Total hole area}}{\text{Total film area}} \times 100$$

When the ratio is less than 10%, adhesive area of the reverse face of the perforated film to which an applied adhesive reaches through the holes is often less than 5%, and the laminated layer is easily peeled off. On the other hand, when the ratio is more than 90%, the strength of the perforated film is lowered, and it is often broken or torn during its production. The tear strength, perforation strength and Gelbo test strength are also insufficient. The adhesive area applicable to the invention is 5 to 95%, preferably 15 to 70%. Hole size is 0.5 to 25 mm in diameter, preferably 1 to 20 mm, more preferably 2 to 15 mm.

The spunbonded nonwoven fabric layer is laminated on the outer side of the perforated film layer.

The spunbonded nonwoven fabric is made of long fiber. Manufacturing processes of this nonwoven fabric comprises injection of melted thermoplastic resin, spinning and drawing, separation of single fiber, formation of sheet, adhesion and then after-treatment. Nylons, polyesters, polypropylenes, polyethylenes, polyurethane, etc. are usually employed as the raw material. These manufacturing processes, structures and properties of the spunbonded nonwoven fabric are described in detail on pages 154–171 of "Fushoku-Fu Yoron" (Author Y. Miura, Published by Kabushiki Kaisha Kobunshi Kanko-Kai in 1973). Radioactive substances, acids, alkalies, oxidizing substances, reducing substances, monomers of thermoplastic resins, mercury, fluorescent materials, iron, copper and nickel, etc. badly influence upon the photosensitive material, such as fogging, increase or decrease of sensitivity, occurrence of unevenness like spots, change of gradation or the like. Therefore, a spunbonded nonwoven fabric of which the contents of the above materials are as little as possible should be employed. Tear strength and rigidity of spunbonded nonwoven fabric are larger than those of wet nonwoven fabric and paper having the same areal weight (g/m$^2$). Since spunbonded nonwoven fabric is made of long fibers of thermoplastic resin, the adhesive tightly adheres to it by extrusion laminating. Furthermore, it is possible to adhere to L-LDPE film layer by heat seal. Since it is more heat-resistant than L-LDPE film layer, its bag-making properties are also good. Suitable area weight is in the range of 10 to 150 g/m$^2$ in view of cost, physical strength, bag-making properties, etc.

The adhesive layer penetrates holes of the perforated film, and adheres the spunbonded nonwoven fabric layer.

The adhesives is able to adhere to the perforated film, the spunbonded nonwoven fabric and a flexible sheet to be joined, and selected from a thermoplastic resin melting adhesives including a polyolefin adhesives, a hot melting type gum adhesives and a solution type adhesives. The polyolefin adhesives include a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-acrylic ester copolymer, various ionomers ("SURLYN" Dupont, "Himiran" Mitsui Polychemicals Co., Ltd., etc.) and a graft copolymer. The solution type adhesives are divided into adhesives for wet lamination and adhesives for dry lamination. The adhesives for wet lamination are emulsion or latex. Examples of the emulsion-type adhesives are polyvinyl acetate emulsion, an emulsion of vinyl acetate-ethylene copolymer, an emulsion of vinyl acetate-acrylic ester copolymer, an emulsion of acrylic copolymer and an emulsion of ethylene-acrylic acid copolymer. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination where paraffin wax, microcrystalline wax, ethylene-vinyl acetate copolymer, ethylene-ethylacrylate copolymer and etc. are blended, pressure-sensitive adhesives and temperature-sensitive adhesives may also be employed. Melting point of the adhesive employed is preferably 50° C. lower than from the melting point of the flexible sheet in order to laminate without bad influence upon the flexible sheet by a thermal melting adhesion.

Thickness of the adhesive layer formed by extrusion laminating using a thermoplastic resin is usually 7 to 100 μm, preferably 15 to 50 μm. However, the thickness is determined based upon cost, rate of application, thickness of the whole layers, and etc., and accordingly, the thickness is not limited to the above range.

The other layer which is joined with the adhesive is the L-LDPE film layer described below or other flexible sheet layer. The adhesive is applied on either the spunbonded nonwoven fabric layer or the flexible sheet layer, and it penetrates holes of the perforated film layer to adhere the other layer.

Lamination may be carried out according to an usual method such as a heat sealing (hot bar sealing, impulse heat sealing, supersonic welding, etc.), the method using an adhesive (wet laminating, dry laminating, hot melt laminating, extrusion laminating, etc.) and co-extrusion method.

The L-LDPE film layer is located as the inner surface layer which is in contact with the photosensitive material, and it is joined to the spunbonded nonwoven fabric layer through the adhesive layer and the perforated film layer. A flexible sheet layer, together with an adhesive layer if necessary, may be provided between the adhesive layer and the L-LDPE film layer. It contains more than 50 weight % of L-LDPE resin.

L-LDPE is a copolymer of ethylene and α-olefin, and it has a linear structure having short branches. Carbon number of the α-olefin is 3–13, preferably 5–10, and examples are butene-1, 4-methylpentene-1, hexene-1 and octene-1. Preferable α-olefins are 4-methylpentene-1, hexene-1 and octene-1. Suitable ethylene content of L-LDPE is 85–99.5 mol. %, i.e. α-olefin content is 0.5–15 mol. %, and preferable ethylene content is 90–99.5 mol. %, i.e. α-olefin content is 0.5–10 mol. %. Density is usually in the range of 0.87–0.95 g/cm$^3$, preferably 0.91–0.94 g/cm$^3$, and melt index (M.I.) is preferably 0.4–15 g/minutes. (JIS K 6760). Such a L-LDPE is manufactured by low pressure method. Examples of L-LDPE are "DOWLEX" (trade name, Dow Chemical Co., Ltd.), "STAMILEX" (trade name, DSM) and "ULTZEX" (trade name, Mitsui Petroleum Chemical Industries Co., Ltd.).

The L-LDPE resin is superior to LDPE resin in strength, but it is more difficult to processing.

As the resin to be blended with L-LDPE, LDPE is preferably employed. Other polyethylene polymers, such as EVA, EEA, ethylene-methacrylate copolymer (EMA), polyisobutylene and ethylene-acrylic acid copolymer (EAA), ionomer resins, polypropylene resins, etc. can be added to the extent so far as its fundamental characteristics are not changed.

The L-LDPE film is molded, for example, by T die extrusion or inflation process. Melt tension and fluidity of L-LDPE resin are large problems in molding, and the energy necessary to produce film is larger than that of a conventional polyethylene. Modification or exchange of inflation molding machine is sometimes required. For that purpose, a modification of screw structure has been proposed (Japanese Patent Application KOKAI No. 55-117638). However, according to the masterbatch method, described later, such modification is not necessary in the case L-LDPE containing carbon black and more than 5% of LDPE resin, EEA resin, EVA resin, etc., and T die and inflation molding machine can be used as it is. In the inflation process, the L-LDPE film of which the difference between longitudinal direction (MD) strength and lateral derection (TD) strength is small can be produced by raising the melting temperature of L-LDPE resin or by adjusting the blow-up ratio to 1.2 to 2.4. The L-LDPE film layer may constitute a part of an inflation film where two or more layers are coextruded. Thickness of the L-LDPE film is thicker than 20 μm, and the thickness of 35 to 120 μm is preferable.

In addition to the spunbonded nonwoven fabric layer and the L-LDPE film layer, other flexible sheet layer(s) may further be added to the laminated film of the invention. As such a flexible sheet layer, various thermoplastic resin films such as various polyethylene films, ethylene copolymer films, polypropylene films, polyvinyl chloride films, polyvinylidene chloride films, polyamide films, polycarbonate films, fluorocarbon polymer films, polyester films and their modified resin films. Various flexible sheets such as a metallized film such as aluminum-metallized film, cellulose acetate film, cellophane, polyvinyl alcohol film, paper, nonwoven fabric, cross laminated airly fabric, a porous film such as foamed polyethylene sheet, foamed polystyrene sheet and foamed polyurethane sheet are also suitable. The additional flexible sheet layer may be single, or two or more flexible sheet layers may be combined.

Among the flexible sheets, the metallized film is particularly suitable for the material packaging photosensitive materials.

Metallization is carried out according to a known method, such as vacuum evaporation, sputtering, ion plating, or electron beam heating. The metallic membrane layer may be formed one face or both faces of the flexible sheet layer.

The metallic membrane layer may be formed of a pure metal such as Al, Sn, Zn, Co, Cr, Ni, Fe, Cu, etc., alloys thereof, or any other metals of which metallic membrane layer can be made, but aluminum is the most preferable in terms of processing and cost.

Thickness of metallic membrane layer to be metallized is 55–1200 Å. When the thickness is thinner than 55 Å, antistatic properties of the film is insufficient. Moreover, in order to secure moistureproof and light-shielding, thickness of other layers such as the polyethylene polymer layer, a heat-resistant sheet layer and a heat sealing layer (the heat sealing layer endowed with light-shielding is preferable.) must be increased. On the other hand, when the thickness is thicker than 1200 Å, degradation of the thermoplastic resin film occurs by the heat of metallizing, and strength of the laminated film to be produced falls. In the case of aluminum-metallized membrane, preferable thickness is thicker than 70 Å, more preferably 80 to 800 Å, further more preferably 100 to 600 Å.

A protection layer may be provided on the metallic membrane, if necessary. As the protection layer, acrylic resin, a cellulose resin such as cellulose acetate, polyurethane, epoxy resin, polyester, an ionomer resin, EEA resin, various polyethylenes or polypropylenes is employed. In addition, a wax, gelatin or polyvinyl alcohol can also be employed. Thickness of the protection layer is made extremely thin such as thinner than 50 μm preferably thinner than 5 μm in order to eliminate static electricity effectively. Such a protection layer may be formed by a known solution coating or spray coating. A conductive material such as an antistatic agent, carbon black, a metal powder such as aluminum powder or aluminum paste or carbon fiber may be added to a flexible sheet, a light-shielding layer, an adhesive layer or the protection layer and thereby elimination of static electricity is made sure.

The additional flexible sheet layer may be laminated in the similar manner as described previously.

Since the packaging material of the invention is employed for packaging a photosensitive material, it should be light-shielding. In order to secure light-shielding, 0.1 to 30 wt. % of a light-shielding material may be added to one or more layers such as a flexible sheet layer, an adhesive layer, etc. Alternatively, a light-shielding film such as a colored paper, a metal foil such as aluminum foil or a thin steel film coated with zinc having a thickness of 5 to 50 μm, a paper having a metallized layer of 55 to 1200 Å such as an aluminum metallized paper, or a metallized film such as aluminum metallized film may be laminated. The light-shielding property may be added by printing.

When the light-shielding property is secured by blending a light-shielding material, suitable content is 0.5 to 36 g per m$^2$ of whole laminated layers. In the case of stretched film, suitable content is 0.1 to 7 wt. %, and when the content is beyond 12 wt, %, fish eye problem and lowering of physical strength happen. While, in the case of unstretched film or a flexible sheet such as paper, the content may be up to 30 wt. % and 36 g/m$^2$.

The light-shielding material includes every material capable of shielding visible and ultraviolet lights.

Examples of the light-shielding material are various carbon blacks, an iron oxide, zinc white, a titanium oxide, clay, aluminum powder, aluminum paste, calcium carbonate, mica, barium sulfate, talc, cadmium pigments, chrome yellow, red iron oxide, cobalt blue, copperphthalocyanine pigments, monoazo and polyazo pigments, aniline black and various metal fibers. Various carbon blacks, aluminum powder and aluminum paste from which volatile components are removed are preferable.

The form of the light-shielding material prior to blending may be powder, paste, wet state, masterbatch, pellets, etc.

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic character, they are also preferable, though they are expensive. They may be blended to the oil furnace black in order to improve its character. Since Ketschen carbon black sometimes causes fogging of photosensitive materials, its selection or a countermeasure in a photosensitive emulsion is necessary. Suitable pH of carbon black is at 5 to 9, particularly at 6 to 8, and suitable mean particle size is 10 to 50 $\mu$m. Particularly, the oil furnace carbon black or the acetylene black having pH 6 to 9 and mean particle size of 15 to 30 $\mu$m are preferable. By using the carbon black of such pH and particle size, a packaging material having the following merits is obtained. That is, the occurrence of fogging is rare, increase or decrease of photosensitivity scarcely happens, light-shielding ability is large, and the lumps of carbon black and pinholes such as fish eye hardly generate.

As the method of blending a light-shielding material, the masterbatch method is preferable in points of cost and clear process. Various masterbatch methods are known, and any known method may be employed. Such a masterbatch method includes the method of dispersing carbon black into a polymer organic solvent solution to produce a masterbotch (Japanese Patent KOKOKU No. 40-26196) and the method of dispersing carbon black into polyethylene to produce a masterbatch (Japanese Patent KOKOKU No. 43-10362).

In this method, first, a masterbatch of LDPE is prepared by blending more than 2%, usually more than 10%, of carbon black with LDPE. Then, L-LDPE is mixed with this masterbatch so that carbon black content becomes a prescribed value. Instead of LDPE other polyolefin resins such as EEA and EVA or other thermoplastic resins capable of mixing with L-LDPE may also be employed. In this masterbatch method, mixing and dispersing of carbon black is easier than the case of blending carbon black directly with L-LDPE. As a result, fish eye problem is improved and manufacturing cost is lowered. In addition, though the L-LDPE film layer produced by this method always contain LDPE, processing character of the mixed polymer of L-LDPE and LDPE is superior to that of L-LDPE alone. The resin for masterbatch is not limited to LDPE. As this resin, a polyolefin resin of which MI is higher than L-LDPE is preferable because of homogeneous blending. L-LDPE may also be employed as the resin for masterbatch in order to save cost.

L-LDPE resin film is superior to LDPE resin film in strength, but it is inferior in the difficulty of processing, the occurrence of blocking between films and its poor slipping character. Accordingly, it was considered that this film was not suitable for packaging. However, the present inventor has examined the influence of carbon black upon L-LDPE resin, and he has found that physical strength of the L-LDPE resin largely increases by blending carbon black contrary to the case of LDPE resin. That is, strength of LDPE resin is essentially weaker than L-LDPE resin, and it is remarkably lowered by adding carbon black.

The effect of carbon black clearly appears at 1 wt. %, and remarkably appears at more than 3 wt. %. While, lumps increase with increasing the amount of carbon black. When its content exceeds 30 wt. %, the lumps remarkably increases and pinholes also forms. On the other hand, carbon black is effective as light-shielding. In this case, light-shielding effect appears at 0.3 wt. %, clearly appears at 1 wt. %, and remarkably appears at more than 3 wt. %. As the packaging material for photosensitive materials, moistureproofness, flatness, strength of film surface, heat seal ability and contamination of a photosensitive article or material are also problems. Accordingly, when these problems are also taken into consideration, suitable content of carbon black is in the range of 0.1 to 15 wt. %, and the range of 3 to 7 wt. % is particularly preferable.

Carbon black is preferably blended into the L-LDPE film layer to touch a photosensitive article or material to be packaged. By this location, the carbon black effectively shields light, it prevents the occurrence of blocking, it gives slipping character, and it exhibits antistatic properties.

Various additives may be added to one or more of the above layers. Examples of the additives are described below.
(1) Plasticizer; phthalic acid esters, glycol esters, fatty acid esters, phosphosic acid esters, etc.
(2) Stabilizer, lead compounds, cadmium compounds, zinc compounds, alkaline earth metal compounds, organic tin compounds, etc.
(3) Antistatic agent; cation surfactants, anion surfactants, nonion surfactants, ampholytic surfactants, etc.
(4) Flame retardant; phosphoric acid esters, phosphoric acid ester halides, halides, inorganic materials, polyols containing phosphor, etc.
(5) Filler; alumina, kaolin, clay, calcium carbonate, mica, talc, titanium oxide, silica, etc.
(6) Reinforcing agent; glass roving, metallic fiber, glass fiber, glass milled fiber, carbon fiber, etc.
(7) Coloring agent; inorganic pigments (Al, $Fe_2O_3$, $TiO_2$, ZnO, CdS etc.), organic pigments (carbon black, etc.), dyes, etc.
(8) Blowing agent; inorganic blowing agents (ammonium carbonate, sodium hydrogen carbonate), organic blowing agents (nitroso compounds, azo compounds) etc.
(9) Vulcanizing agent; vulcanization accelerator, acceleration assistant, etc.
(10) Deterioration preventing agent, ultraviolet absorber, antioxidant, metal deactivator, peroxide decomposing agent, etc.
(11) Lubricant; paraffin wax, fatty acids, fatty acid amides, esters, higher alcohols, etc.
(12) Coupling agent; silane compounds, titanium compounds, chromium compounds, aluminum compounds etc.
(13) Various thermoplastic resins, rublers The packaging material of the invention is suitable for packaging silver halide photographic materials for photographic purpose, diazo photographic materials, photoseneitive resins, self-developing type photographic materials, diffusion-transfer type photographic materials and other photographic materials which are degraded by moisture or a gas. The packaging material of the invention is particularly suitable for a heavy photosensitive material and a roll having a sharp edge.

Package form may be usual, and includes a single-sheet flat bag, a double-sheets flat bag, a square bottom bag, a self-standing bag, single-sheet gusset bag, a double-sheets gusset bag, a film sheet, inner lining for a moisture proof box and a leader paper. The sealing form may also be usual, and includes heat sealing, impulse heat sealing, supersonic welding and high frequency sealing. The methods of using an adhesive and a pressure sensitive adhesive may also be utilized.

The packaging material of the invention is superior in the small difference in tear strength between longitudinal direction and lateral direction, in physical strengthes, in heat sealing properties and in light-shielding property. As a result, its thickness can appreciably be made thinner than the conventional packaging material, and its cost is lowered.

EXAMPLES

The packaging material of Example 1 corresponds to the embodiment illustrated in FIG. 1.

The light-shielding L-LDPE film layer 3a consists of L-LDPE resin ("ULTZEX #2020L", Mitsui Petrochemical Industries Co., Ltd.) of which α-olefin is 4-methylpentene-1 ($C_6$) containing 3 weight % of oil furnace carbon black, and it was formed by inflation process. The blow-up ratio is 1.95, and the thickness of the film is 70 μm.

The perforated film layer 1 consists of LDPE resin ("PANHOLE", Dainippon Plastics Co., Ltd.). and its holes were perforated at the time of its extrusion molding. Thereafter, this film was biaxially stretched. The thickness of the film is 50 μm. Each hole is the oval having the size of 5 by 9 mm, and the hole area ratio is 50%.

The spunbonded nonwoven fabric layer 4 is "SYNTEX" (Mitsui Petrochemical Industries Co., Ltd.) having an area weight of 20 g/m².

The LDPE extrusion laminating adhesive layer 2 having a thickness of 20 μm was applied to the light-shielding L-LDPE film layer 3a, and the spunbonded nonwoven fabric layer 4 was joined with the adhesive 2 penetrated holes 5 of the perforated film layer 1 to form the laminated film.

The packaging material of Example 2 is the same as Example 1 except that the area weight of the spunbonded nonwoven fabric layer 4 "SYNTEX" (Mitsui Petrochemical Industries Co., Ltd.) is 25 g/m² and the adhesive layer 2 was applied on the spunbonded nonwoven fabric layer 4.

The packaging material of Example 3 is the same as Example 1 except that the area weight of the spunbonded nonwoven fabric layer 4 "SYNTEX" (Mitsui Petrochemical Industries Co., Ltd.) is 40 g/m² and the thickness of the adhesive layer 2 is 25 μm.

The packaging material of Example 4 is the same as Example 1 except that the perforated film ("PANHOLE" Dainippon Plastics Co., Ltd.) of nylon 66 having a thickness of 35 μm is employed. Holes 5 of the perforated film 1 are circles having the size of 6 mm in diameter, and the hole area ratio is 60%.

Conventional packaging material 1 corresponds to FIG. 12. This packaging material consists of 50 μm in thickness of a light-shielding LDPE film layer 11a containing 3 weight % of carbon black, a metal foil layer 8a consisting of 7 μm in thickness of aluminum foil through 15 μm in thickness of a LDPE adhesive layer 2, a flexible sheet layer 6 consisting of 35 g/m² of a bleached kraft paper through 15 μm in thickness of a LDPE adhesive layer 2, and 50 μm in thickness of a light-shielding LDPE film layer 11a containing 3 weight % of carbon black through 15 μm in thickness of a LDPE adhesive layer 2.

Conventional packaging material 2 corresponds to FIG. 14. This packaging material consists of a foamed polyethylene sheet layer 12 having a thickness of 500 μm, two light-shielding uniaxially stretched HDPE film layers 13a each containing 4.5 weight % of carbon black and having a thickness of 40 μm, and a flexible sheet layer 6 consisting of 70 g/m² of kraft paper. The two stretched films 13a are laminated on both faces of the foamed sheet layer 12 through each 15 μm in thickness of a LDPE adhesive layer 2 so that their orientation axes cross at 90 degrees, and the flexible sheet layer 6 is laminated on one stretched film 13a through 15 μm in thickness of a LDPE adhesive layer 2.

Conventional packaging material 3 corresponds to FIG. 13. This packaging material consists of 1000 μm in thickness of a foamed polyethylene sheet layer 12 and two light-shielding uniaxially stretched HDPE film 13a each containing 4.5 weight % of carbon black and having a thickness of 40 μm laminated on both faces of the above foamed sheet layer 12 through each 15 μm in thickness of a LDPE adhesive layer 2 so that their orientation axes cross at 90 degrees.

Comparative packaging material 1 corresponds to FIG. 11. This packaging material consists of 100 μm in thickness of a light-shielding LDPE film layer 11a containing 3 weight % of carbon black, a metal foil layer 8a consisting of 9 μm in thickness of aluminum foil laminated thereon through 15 μm in thickness of a LDPE adhesive layer 2, and a flexible sheet layer 6 consisting of 60 g/m² of a kraft paper further laminated thereon through 15 μm in thickness of a LDPE adhesive layer 2.

Constitutions of the above packaging materials are tablated in Table 1, and their properties are tablated in Table 2.

In the packaging materials, the following materials are employed;

| | |
|---|---|
| LDPE layer: 11a | "DFD-0111" (Nippon Unicar Co., Ltd.) MI: 2.4 g/10 minutes, Density: 0.923 g/cm³ |
| HDPE layer: 13a | "HYZEX" (Mitsui Petrochemical Industries Co., Ltd.) MI: 0.4 g/10 minutes, Density: 0.964 g/cm³ |
| LDPE adhesive layer: 2 | "MIRASON 14" (Mitsui Polychemicals Co., Ltd.) MI: 5.1 g/10 minutes, Density: 0.919 g/cm³ |
| Carbon black: | "#44B Oil furnace carbon black" (Mitsubishi Chemical Industries Ltd.) Mean particle size: 21 μm, pH: 7.7 |

TABLE 1

| Exp. No. | | Total Thickness (μm) | Inner Layer ←→ Outer Layer | | | | | | | FIG. No. |
|---|---|---|---|---|---|---|---|---|---|---|
| | | | 1 (μm) | 2*⁷ (μm) | 3 (μm) | 4*⁷ (μm) | 5 g/m² (μm) | 6*⁷ (μm) | 7 (μm) | |
| Invention | 1 | 172 | L-LDPE (70) | LDPE (20) | PF*² (50) LDPE | — | SNF*⁴ 20 (32) | — | — | 1 |
| | 2 | 186 | L-LDPE (70) | — | PF*² (50) LDPE | LDPE (20) | SNF*⁴ 25 (46) | — | — | (1) |
| | 3 | 233 | L-LDPE (70) | LDPE (25) | PF*² LDPE | — | SNF*⁴ 40 | — | — | 1 |

TABLE 1-continued

| | Exp. No. | Total Thickness (μm) | Inner Layer ⟶ Outer Layer | | | | | | | FIG. No. |
|---|---|---|---|---|---|---|---|---|---|---|
| | | | 1 (μm) | 2*7 (μm) | 3 (μm) | 4*7 (μm) | 5 g/m² (μm) | 6*7 (μm) | 7 (μm) | |
| | 4 | 172 | L-LDPE (70) | LDPE (25) | (50) PF*2 Nylon (35) | — | (75) SNF*4 25 (46) | — | — | 1 |
| Comparative | 1 | 208 | LDPE (100) | LDPE (15) | Al (9) | LDPE (15) | KP*5 60 (75) | — | — | 11 |
| Conventional | 1 | 200 | LDPE (50) | LDPE (15) | Al (7) | LDPE (15) | BKP*6 35 (44) | LDPE (15) | LDPE (50) | 12 |
| | 2 | 480 | HDPE*1 (40) | LDPE (15) | FPE*3 (500) | LDPE (15) | HDPE*1 (40) | LDPE (15) | KP*5 70 (86) | 14 |
| | 3 | 609 | HDPE*1 (40) | LDPE (15) | FPE*3 (1000) | LDPE (15) | HDPE*1 (40) | — | — | 13 |

*1 Uniaxially stretched HDPE
*2 Perforated film
*3 Foamed polyethylene sheet
*4 Spunbonded nonwoven fabric
*5 Kraft paper
*6 Bleached kraft paper
*7 Adhesive layer

TABLE 2

| Exp. No. | | T.S.*1 MD*3 (g) | T.S.*1 TD*4 (g) | I.P.S.*2 Right side (kg·cm) | I.P.S.*2 Reverse side (kg·cm) | Curl (cm) | G.S.*5 (times) | L.S.*6 | H.T.*7 | H.S.*8 | B.A.*9 |
|---|---|---|---|---|---|---|---|---|---|---|---|
| Invention | 1 | 1600< | 1600< | 15.6 | 25.5 | A (2.1) | A (200<) | A | B | A | A |
| | 2 | 1351 | " | 14.6 | 23.2 | A (1.8) | A (200<) | " | " | " | " |
| | 3 | 1600< | " | 18.6 | 24.8 | A (0.9) | A (200<) | " | " | " | " |
| | 4 | " | " | 19.3 | 25.8 | A (1.6) | A (200<) | " | " | " | " |
| Comparative | 1 | 326 | 301 | 9.8 | 11.6 | E (12.0) | C (14) | " | E | B | B |
| Conventional | 1 | 294 | 610 | 5.1 | 5.8 | B (2.5) | C (18) | " | " | " | " |
| | 2 | 758 | 1600< | 14.7 | 14.1 | A (1.5) | A (200<) | " | " | C | C |
| | 3 | 453 | " | " | 14.8 | A (0.7) | A (200<) | " | " | E | E |

*1 Tear Strength
*2 Impact Puncture Strength
*3 Longitudinal Direction
*4 Lateral Direction
*5 Gelbo Test Strength
*6 Light-Shielding Ability
*7 Hot-Tack Property
*8 Heat Sealing Property
*9 Bag-Making Aptitude Evaluations in Table 2 are carried out as follows;

| A very excellent | B excellent |
|---|---|
| C practical | D having a problem |
| E impractical | |

Testing methods were as follows;
Density; JIS K 6760 (=ASTM D-1505)
Melt Index; JIS K 6760 (=ASTM 1238)
Thickness; JIS P 8118
Tear Strength; JIS P 8116
Impact Puncture Strength; JIS P 8134
Gelbo Test Strength;
Estimated by the number of bendings until the sample lost its light-shielding property due to the occurrence of pin holes. The testing machine according to U.S. Military Standard MIL-B 131 was employed. The larger number expresses the larger strength.

| A 101 times or more | B 51–100 times |
|---|---|
| C 7–50 times | D 3–7 times |
| E 2 times or less | |

Light-Shielding Character;
A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

Hot Tack Properties; (Hot-Seal Ability)
Two sheets of each exemplified film having 15 mm in width was sealed at 160° C. by heat sealing, and just after, the open ends were pulled by the weight of 45 g at the releasing angle of 22.5 degrees. This character was estimated by the released length (cm).

Curl;

A circular test piece having 10 cm in diameter was prepared from the sheet to be tested. The test piece was put on a flat plate, and allowed to stand at 20° C. at 65% humidity for 24 hours under no-load state. The length (1) between both edges was measured, and the curl value was expressed as 10−1 (cm).

I claim:

1. A laminated film having light shielding properties for packaging photosensitive material comprising:
   (a) a perforated thermoplastic film layer, comprising a thermoplastic resin, having a thickness of from 7 to 150 μm and a hole area ratio of from 10 to 90%;
   (b) an adhesive layer which penetrates the perforations in the perforated thermoplastic film layer;
   (c) a first layer comprising a spun bonded nonwoven fabric on one side of the perforated film layer;
   (d) a second layer on the side of the perforated film layer away from the first layer; the first layer and the second layer bonded together by the adhesive through the perforations in the perforated film layer; said second layer being selected from:
      (1) a flexible sheet layer comprising a low pressure linear low density polyethylene film layer containing more than 50% by weight of a low-pressure linear low density polyethylene resin in the polyethylene film, and
      (2) a flexible metal foil layer having laminated to its surface away from said adhesive, a low pressure linear low density polyethylene film layer containing more than 50% by weight of a low-pressure linear low density polyethylene resin in the polyethylene film.

2. The packaging material of claim 1, wherein the hole area ratio is represented by the following formula:

$$\text{The hole area ratio} = \frac{\text{Total hole area}}{\text{Total film area}} \times 100.$$

3. The packaging material of claim 1, wherein said spunbonded nonwoven fabric is made of a thermoplastic resin selected from the group consisting of polyamides, polyesters, polypropylenes, polyethylenes and polyurethane.

4. The packaging material of claim 1, wherein the area weight of said spunbonded nonwoven fabric is in the range of 10 to 150 g/m$^2$.

5. The packaging material of claim 1, wherein said adhesive is selected from the group consisting of polyethylenes, polypropylenes, polybutenes, ethylene-propylene copolymers, ethylene-vinyl acetate copolymer, ethylene-acrylic ester copolymer, ionomers, a graft copolymer, polyvinyl acetate emulsion, the emulsion of vinyl acetate-ethylene copolymer, the emulsion of vinyl acetate-acrylic ester copolymer, the emulsion of vinyl acetate-maleic ester copolymer, the emulsion of acrylic copolymer, the emulsion of ethyleneacrylic acid copolymer, natural rubber latex, styrene-butadiene rubber latex, acrylonitrile-butadiene rubber latex, chloroprene rubber latex, polyurethane adhesive, adhesives for hot melt lamination containing paraffin wax, microcrystalline wax, ethylene-vinyl acetate copolymer and ethylene-ethylacrylate copolymer, pressure-sensitive adhesives and temperature-sensitive adhesives.

6. The packaging material of claim 1, wherein said flexible sheet layer is said low-pressure linear low-density polyethylene film layer laminated to a metal foil.

7. The packaging material of claim 1, wherein said adhesive is applied to said spunbonded nonwoven fabric layer or said flexible sheet layer.

8. The packaging material of claim 1, wherein said low-pressure linear low-density polyethylene contains in copolymerized form, 4-methylpentene-1, hexene-1, or octene-1.

9. The packaging material of claim 1, wherein said low-pressure linear low-density polyethylene film contains 0.1 to 15 weight % of carbon black.

10. The packaging material of claim 1, wherein said thermoplastic resin is selected from the group consisting of polystyrene, polyamides, ethylene-vinyl acetate copolymer, ethylene-ethylacrylate copolymer, polyethylene terephthalate, polyvinyl chloride, polyvinylidene chloride, a low-pressure high-density polyethylene, a low-pressure medium-density polyethylene, a high-pressure low-density polyethylene, a low-pressure linear low-density polyethylene and polypropylenes.

11. The packaging material of claim 10, wherein said perforated film is uniaxially or biaxially stretched.

12. The packaging material of claim 1, wherein the figures of said holes of the perforated film do not have an angle less than 90 degrees.

13. The packaging material of claim 12, wherein said holes are circles or ovals.

14. The packaging material of claim 12, wherein the sizes of said holes are in the range from 0.5 to 25 mm in diameter.

* * * * *